United States Patent [19]
Takahashi

[11] Patent Number: 6,079,879
[45] Date of Patent: Jun. 27, 2000

[54] HYDRODYNAMIC BEARING

[75] Inventor: Takeshi Takahashi, Kashiba, Japan

[73] Assignee: Koyo Seiko Co., Ltd., Osaka, Japan

[21] Appl. No.: 09/153,411

[22] Filed: Sep. 2, 1998

[30] Foreign Application Priority Data

Sep. 5, 1997  [JP]  Japan .................................. 9-257585

[51] Int. Cl.$^7$ .................................................. F16C 33/74
[52] U.S. Cl. ........................................ 384/119; 384/132
[58] Field of Search .................................... 384/119, 132, 384/110

[56] References Cited

U.S. PATENT DOCUMENTS

| | | | |
|---|---|---|---|
| 4,445,793 | 5/1984 | Shinohara | 384/130 |
| 5,423,612 | 6/1995 | Zang et al. | 384/132 X |
| 5,722,775 | 3/1998 | Thijsse et al. | 384/119 |
| 5,765,952 | 6/1998 | Dekker et al. | 384/132 |
| 5,876,124 | 3/1999 | Zang et al. | 384/119 X |

FOREIGN PATENT DOCUMENTS

| | | |
|---|---|---|
| 779419 | 7/1957 | United Kingdom . |
| 1187997 | 4/1970 | United Kingdom . |
| 1224496 | 3/1971 | United Kingdom . |
| 1577737 | 3/1977 | United Kingdom . |

OTHER PUBLICATIONS

International Search Report, UK Patent Office, Date of Search: Dec. 18, 1998.

*Primary Examiner*—Thomas R. Hannon
*Attorney, Agent, or Firm*—Jacobson, Price, Holman & Stern, PLLC

[57] ABSTRACT

A hydrodynamic bearing having a liquid accommodating portion in which, even when a liquid in the bearing expands as a result of a temperature rise, it is possible to prevent the liquid from leaking to the outside. In order to attain the object, in a hydrodynamic bearing including: a shaft and a sleeve which relatively rotate; a dynamic pressure bearing portion which is formed between the shaft and the sleeve; and an accommodation portion which accommodates a liquid in the bearing, and which is disposed in a space between the shaft and the sleeve and in the vicinity of an atmosphere side, the accommodation portion is an opposition space portion in which a conical face formed on the shaft and having a diameter that is gradually reduced as moving toward an end portion of the shaft is opposed to a conical face which is formed on an inner side face of the sleeve and which covers the conical face of the shaft.

2 Claims, 2 Drawing Sheets

HYDRODYNAMIC BEARING

BACKGROUND OF THE INVENTION

The invention relates to a hydrodynamic bearing.

FIG. 3 is a longitudinal section view showing an example of a hydrodynamic bearing of the prior art. The hydrodynamic bearing of the prior art comprises: a shaft 31 which erects from a bed 30 and on which a circumferantial flange 33 is radially formed; a sleeve 32 which is disposed so as to surround the shaft 31 and upper and lower faces 33a and 33b of the flange 33; a radial dynamic pressure bearing portion 35 which is formed between the shaft 31 and the sleeve 32, by dynamic pressure grooves 36 formed in the outer surface of the shaft 31; and first and second axial dynamic pressure bearing portions 37 and 38 which are formed between the upper and lower faces 33a and 33b of the flange 33 and the sleeve 32, by dynamic pressure grooves 39 and 40 formed in the upper and lower faces 33a and 33b of the flange. The sleeve 32 is vertically divided into two portions, i.e., first and second sleeves 32a and 32b which pressingly hold the flange 33 in a vertical direction. The first axial dynamic pressure bearing portion 37 is formed between the first sleeve 32a and the flange 33, and the second axial dynamic pressure bearing portion 38 is formed between the second sleeve 32b and the flange 33. Conical faces 41 and 42 having a diameter which is gradually reduced as moving toward the atmosphere side are formed on the end portions of the shaft 31 on the atmosphere side, respectively. The spaces between inner cylindrical faces 43 and 44 of the first and second sleeves 32a and 32b which are opposed to the conical faces 41 and 42 serve as accommodating portions 45 and 46 which accommodate a liquid in the bearing, respectively.

In the hydrodynamic bearing of the prior art, when the shaft 31 relatively rotates with respect to the sleeve 32, the liquid L in the bearing expands as the temperature rises, to be accommodated in the liquid accommodating portions 45 and 46, thereby preventing the liquid from leaking to the outside. Since the inner side face 43 of the first sleeve 32a is a cylindrical face, the inclination angle β of the conical face 41 of the shaft 31 cannot be set to be large, as shown in FIG. 4. This is because, when the inclination angle β is made large, the space between the conical face 41 of the shaft 31 and the cylindrical inner side face 43 of the first sleeve 32a is made excessively large, thereby causing the liquid L to leak, Therefore, the accommodation amount of the liquid accommodating portion 45 is reduced. Furthermore, the diameter of the liquid accommodating portion 45 is gradually increased as moving toward the atmosphere side, and hence the liquid is susceptible to the centrifugal force, These produce a problem in the leakage of the liquid inevitably easily occurs. Although the problem of the upper accommodating portion 45 of the shaft 31 has been described with reference to FIG. 4, also the lower accommodating portion 46 of the shaft 31 has the same problem.

SUMMARY OF THE INVENTION

It is an object of the invention to provide a hydrodynamic bearing having a liquid accommodating portion in which, even when a liquid in the bearing expands as a result of a temperature rise, it is possible to prevent the liquid from leaking to the outside.

As means for attaining the object, the hydrodynamic bearing is characterized in that it has configuration ① in which the hydrodynamic bearing comprises: a shaft and an sleeve which relatively rotate; a dynamic pressure bearing portion which is formed between the shaft and the sleeve; and an accommodation portion which accommodates a liquid in the bearing, and which is disposed in a space between the shaft and the sleeve and in the vicinity of an atmosphere side, the accommodation portion is an opposition space portion in which a conical face formed on the shaft and having a diameter that is gradually reduced as moving toward an end portion of the shaft is opposed to a conical face which is formed on an inner side face of the sleeve and which covers the conical face of the shaft. Furthermore, the hydrodynamic bearing is characterized in configuration ② in which the accommodation portion is formed in each of end portions of the shaft.

DETAILED DESCRIPTION OF THE PREFERRED EMBODIMENTS

Hereinafter, embodiments of the invention will be described with reference to the accompanying drawings.

Figure 1:
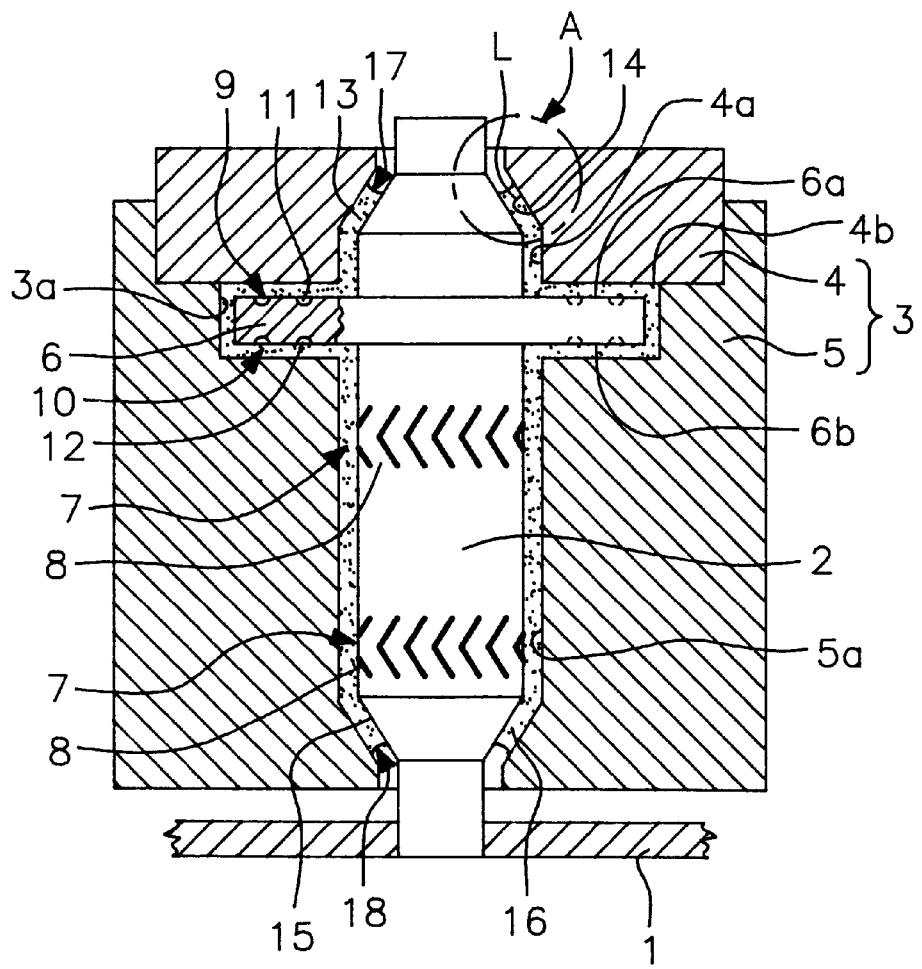
FIG. 1 is a section view of an embodiment of the invention.

FIG. 1 is a longitudinal section view of an embodiment of the hydrodynamic bearing of the invention. The hydrodynamic bearing shown in the figure comprises: a shaft 2 which erects from a bed 1 and on which a circumferential flange 6 is radially formed; a sleeve 3 which is disposed so as to surround the shaft 2 and upper and lower faces 6a and 6b of the flange 6; a radial dynamic pressure bearing portion 7 which is formed between the shaft 2 and the sleeve 3, by dynamic pressure grooves 8 formed in the outer surface of the shaft 2; and first and second axial dynamic pressure bearing portions 9 and 10 which are formed between the upper and lower faces 6a and 6b of the flange 6 and the sleeve 3, by dynamic pressure grooves 11 and 12 formed in the upper and lower faces 6a and 6b of the flange. The sleeve 3 is vertically divided into two portions, i.e., first and second sleeves 4 and 5 which pressingly hold the flange 6 in a vertical direction. The flange 6 is fitted into a peripheral groove 3a which is formed by the first and second sleeves 4 and 5. The first axial dynamic pressure bearing portion 9 is formed between the first sleeve 4 and the flange 6, and the second axial dynamic pressure bearing portion 10 is formed between the second sleeve 5 and the flange 6.

A conical face 13 having a diameter which is gradually reduced as moving toward the atmosphere side is formed on the upper end portion of the shaft 2 on the atmosphere side. A conical face 14 which opposingly covers the conical face 13 or has a diameter that is gradually reduced as moving toward the atmosphere side is formed on the inner cylindrical face 4a of the first sleeve 4. The opposition space between the conical face 13 of the shaft 2 and the conical face 14 of the first sleeve 4 serves as an accommodating portion 17 for a liquid L in the bearing.

Figure 2:
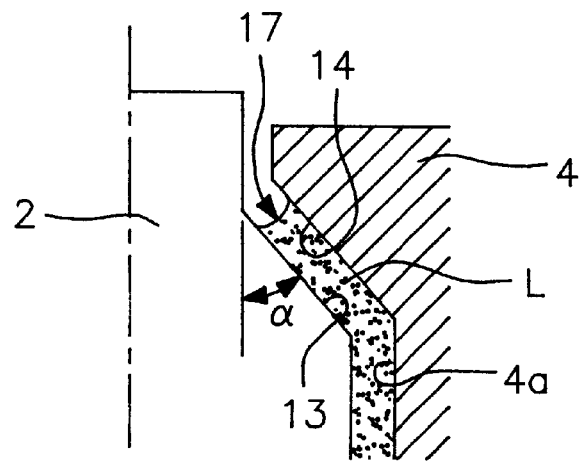
FIG. 2 is an enlarged view of a part A of FIG. 1.
Figure 3:
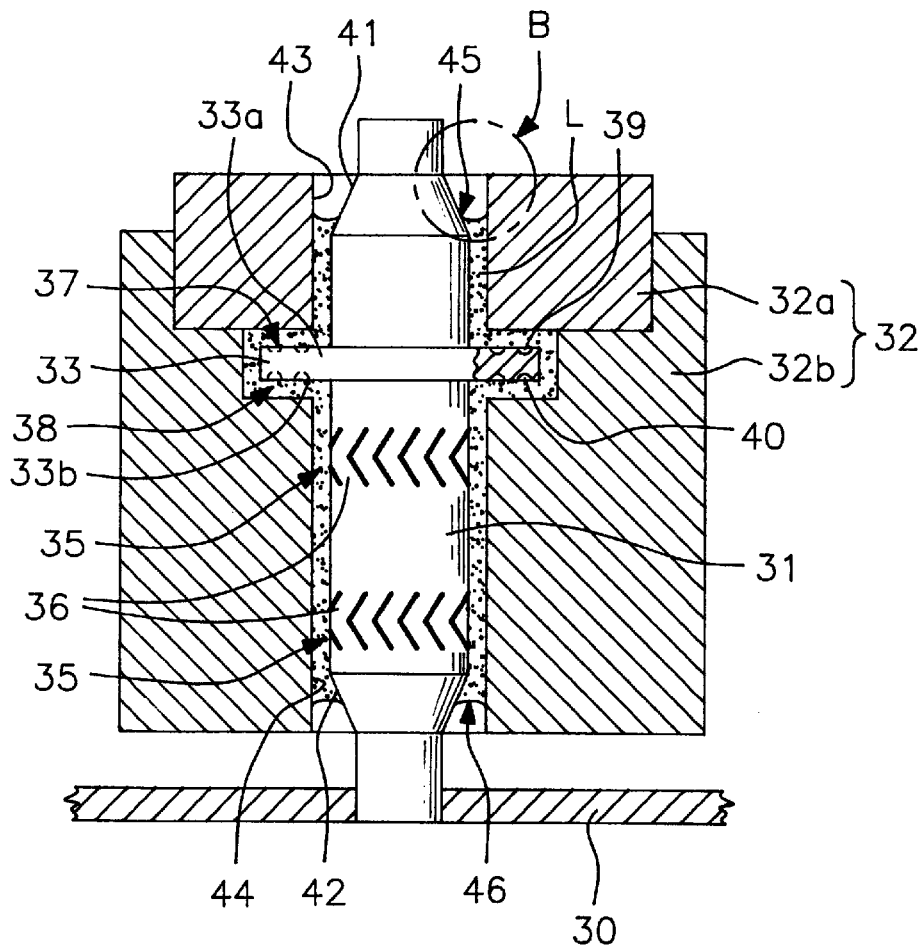
FIG. 3 is a section view of a hydrodynamic bearing of the prior art.
Figure 4:
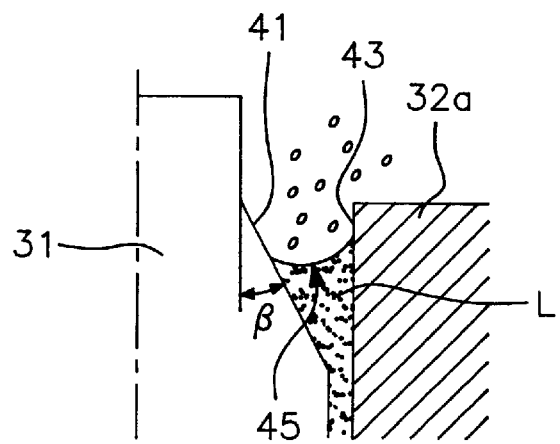
FIG. 4 is an enlarged view of a part B of FIG. 3.

Similarly, a conical face 15 having a diameter which is gradually reduced as moving toward the atmosphere side is formed on the lower end portion fo the shaft 2 on the atmosphere side. A conical face 16 which opposingly covers the conical face 15 or has a diameter that is gradually reduced as moving toward the atmosphere side is formed on the inner cylindrical face 5a of the second sleeve 5. The opposition space between the conical face 15 of the shaft 2 and the conical face 16 of the second sleeve 5 serves as an accommodating portion 18 for the liquid L in the bearing. The accommodating portion 17 will be described in more detail. FIG. 2 is a partial enlarged view of the accommodating portion 17.

The accommodating portion 18 is configured in the same manner, and hence the description of the portion is omitted. Alternatively, only one of the accommodating portions 17 and 18 may be used.

As shown in FIG. 2, the conical face 13 of the shaft 2 has a shape which is covered by the conical face 14 of the first sleeve 4, and hence the inclination angle α of the conical face 13 of the shaft 2 can be made large. In accordance with this, also the inclination angle of the conical face 14 of the first sleeve 4 is similarly set to be equal to the inclination angle α. According to this configuration, the accommodation amount of the liquid accommodating portion 17 can be made large. At the same time, since the liquid accommodating portion 17 is inclined in a direction along which the diameter is gradually reduced toward the atmosphere side, the liquid L is effectively prevented form being flown away by the effect of a centrifugal force or from leaking. Even when the liquid L expands as a result of a temperature rise during the rotation of the bearing, therefore, the liquid L is surely held by the liquid accommodating portion 17.

In the hydrodynamic bearing of the invention, even when the liquid in the bearing expands as a result of a temperature rise, the liquid is held by the liquid accommodating portion 17 which is formed by the conical face 13 in the end portion of the shaft and the conical face 14 on the inner face of the sleeve 4, and which has a diameter that is gradually reduced as moving toward the atmosphere side, and hence leakage of the liquid to the outside of the bearing is prevented form occurring. Also with respect to the accommodating portion 18 which is formed by the conical face 15 formed in the atmosphere side lower end portion of the shaft 2 and having a diameter that is gradually reduced as moving toward the atmosphere side, and the conical face 16 which is formed on the second sleeve 5 and which opposingly covers the conical face 15, similarly, leakage of the liquid to the outside of the bearing is prevented from occurring.

What is claimed is:

1. A hydrodynamic bearing comprising:

a shaft and a sleeve which relatively rotate;

a dynamic pressure bearing portion which is formed between said shaft and said sleeve; and an accommodation portion which accommodate a liquid in said bearing, and which is disposed in a space between said shaft and said sleeve and in the vicinity of an atmosphere side, wherein said accommodation portion is an opposition space portion in which a conical face formed on said shaft and having a diameter that is gradually reduced as moving toward an end portion of said shaft is opposed to a conical face which is formed on an inner side face of said sleeve and which covers said conical face of said shaft, and wherein the inclination angle of said conical face of said shaft is equal to the inclination angle of said sleeve.

2. A hydrodynamic bearing according to claim 1, wherein said accommodation portion is formed in each of end portions of said shaft.

* * * * *